US006582077B1

(12) United States Patent
Tabb et al.

(10) Patent No.: US 6,582,077 B1
(45) Date of Patent: Jun. 24, 2003

(54) ORTHOKERATOLOGICAL CONTACT LENSES AND DESIGN METHODS THEREFOR

(76) Inventors: Roger L. Tabb, 2365 SW. Cedar Hills Blvd., Portland, OR (US) 97225; Daniel G. Ballegeer, 19080 SW. Westword St., Aloha, OR (US) 97007

( * ) Notice: Subject to any disclaimer, the term of this patent is extended or adjusted under 35 U.S.C. 154(b) by 0 days.

(21) Appl. No.: 09/593,246

(22) Filed: Jun. 13, 2000

Related U.S. Application Data
(60) Provisional application No. 60/219,330, filed on Nov. 3, 1999.

(51) Int. Cl.[7] .................................................. G02C 7/02
(52) U.S. Cl. .................................... 351/177; 351/160 R
(58) Field of Search ......................... 351/160 R, 160 H, 351/161, 162, 177

(56) References Cited

U.S. PATENT DOCUMENTS

| | | | | |
|---|---|---|---|---|
| 4,952,045 | A | | 8/1990 | Stoyan ..................... 351/160 R |
| 5,191,365 | A | | 3/1993 | Stoyan ..................... 351/160 R |
| 5,428,412 | A | | 6/1995 | Stoyan ......................... 351/177 |
| 5,695,509 | A | * | 12/1997 | El Hage ...................... 351/161 |
| 5,788,957 | A | | 8/1998 | Harris ...................... 424/78.04 |
| 5,880,809 | A | * | 3/1999 | Lieberman et al. ...... 351/160 R |
| 5,963,297 | A | | 10/1999 | Reim ...................... 351/160 R |
| 6,241,355 | B1 | * | 6/2001 | Barsky ........................ 351/177 |

FOREIGN PATENT DOCUMENTS

WO    WO 98/52090    11/1998

OTHER PUBLICATIONS

Coon, L.J., "Orthokeratology: Part I Historical Perspective," *Journal of the American Optometric Association* 53:187–195 (1982).

Coon, L.J., "Orthokeratology Part II: Evaluating the Tabb Method," *Journal of the American Optometric Association* 55:409–418 (1984).

Dave, T. and Ruston, D., "Current Trends in Modern Orthokeratology," *Ophthal. Physiol. Opt.* 18:224–233 (1998).

Day, J.H., "New Lens Designs in Orthokeratology," *International Orthokeratology Section of NERF $42^{nd}$ Congress* pp. 1–7 (1997).

Mountford, J., "An Analysis of the Changes in Corneal Shape and Refractive Error Induced by Accelerated Orthokeratology," *ICLC* 24:128–144 (1997).

Patterson, T.C., "Orthokeratology: Changes to the Corneal Curvature and the Effect on Refractive Power Due to the Sagittal Length Change," *Journal of the American Optometric Association* 46:719–729 (1975).

Tredici, T.J., "Role of Orthokeratology: A Perspective," *Symposium on Myopia* 86:698–705 (1979).

* cited by examiner

*Primary Examiner*—Jordan M. Schwartz
(74) *Attorney, Agent, or Firm*—Klarquist Sparkman, LLP

(57) ABSTRACT

Orthokeratological contact lens and designs methods satisfy one of a group of design constraints. Arc lengths, surface areas, cross-sectional areas, saggital depth and volumes defined by an intersection of a base surface selected to mold an anterior surface of cornea and a curve located at the position of the anterior surface before molding satisfy specified conditions. In an example, an arc length measured along the anterior surface is equal to a sum of arc lengths measured along a relief surface and the base surface. In another example, a surface area of the anterior surface is equal to a sum of surface areas on the relief surface and the base surface. In addition, contact lenses are disclosed that satisfy these constraints, and instructions for performing the methods are stored on computer readable media.

21 Claims, 4 Drawing Sheets

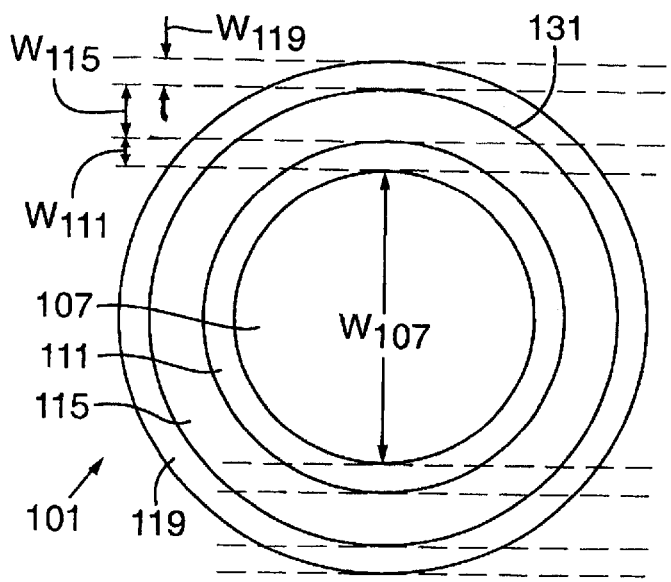
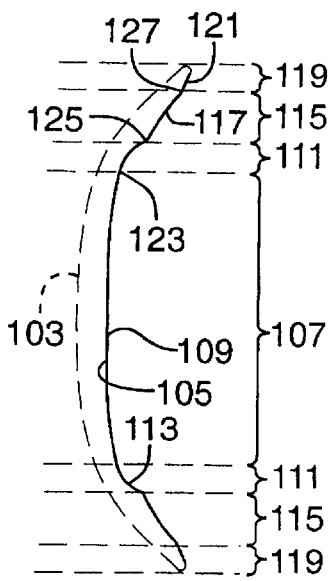
FIG. 1A        FIG. 1B
FIG. 2
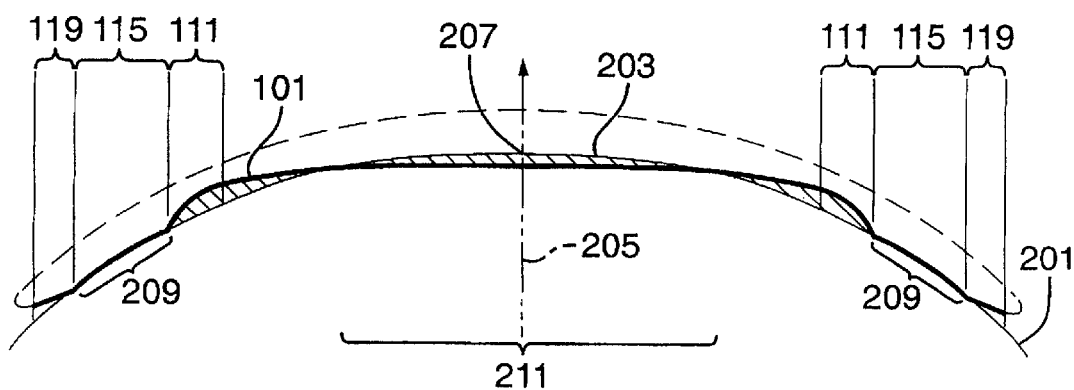
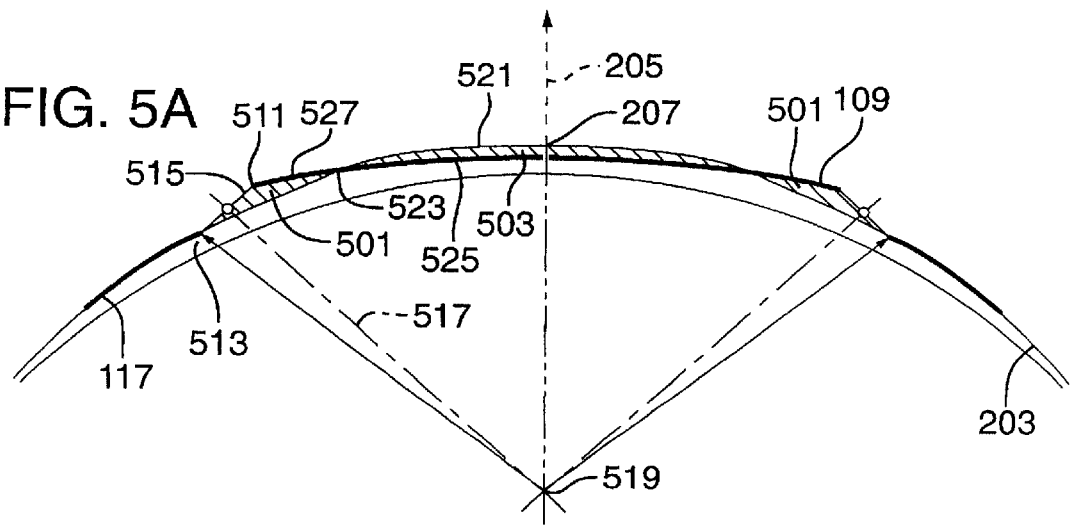
FIG. 5A

FIG. 6

ORTHOKERATOLOGY MASTER APPLICATION

NAME [9-9-99] — 600    ID [126] — 602    PHYS [Dr. Paul]

OD

Design Model [ARC LENGTH ▽] — 606

Prescription [-4] — 604   Target [-4]
Power [0.75]   Toffit [4.75]

ARC LENGTH
CROSS AREA
SURF AREA — 610
ELEVATION
VOLUME
OFF

Steep [44.12]   Axis [0]

DESIGN

|  | BASE | FIT | ALIGN 1 | ALIGN 2 | PERIPH |
|---|---|---|---|---|---|
| RAD | 8.518 | 6.491 | 7.686 | 7.686 | 12 |
| adj | 0 | 0 | 0 | 0 | 0 |
| WID | 6.2 | 0.5 | 0.8 | 0.4 | 0.5 |
| adj | 0 | 0 | 0 | 0 | 0 |

| Tear Lyr | EC/RC | RC/AC | AC/PC | Tot Cham |
|---|---|---|---|---|
| 0.22 | 0.05 | 0.05 | 0.3 | 10.6 |

Thick [0.02]   Color [Blue ▽]   Material [Equalens II ▽]

Comments [                    ]

OD

Design Mo [ARC LE...]
ARC LE
Ks

DESIGN
RAD [8]
adj
WID
adj
Tear
Commen

ORTHOKERATOLOGICAL CONTACT LENSES AND DESIGN METHODS THEREFOR

This application claims benefit of provisional application 60/219,330 filed Nov. 3, 1999.

TECHNICAL FIELD

The disclosure pertains to contact lenses and contact lens design methods.

BACKGROUND

Vision errors such as myopia, hyperopia, and astigmatism can be corrected with glasses, contact lenses, or surgery. Contact lenses are favored by wearers for a variety of reasons, including cosmetic appearance, decreased fogging, superior peripheral vision, and to avoid the risks associated with surgery. Nevertheless, contact lenses have significant disadvantages. For example, wearing contact lenses for extended time periods can result in dry eyes, requiring the use of eye drops, and resulting in unnaturally rapid blinking. In addition, many types of contact lenses require careful cleaning, disinfecting, and storage. Surgical methods avoid these disadvantages but have other disadvantages, including surgical risks and variability in the magnitude and stability of the vision correction provided by surgery.

Contact lenses have been developed that correct myopia or astigmatism by reshaping the cornea. Because the cornea provides most of the refractive power of the eye, modification of the corneal curvature is generally adequate to correct vision errors. For example, the correction of myopia requires flattening the cornea while the correction of astigmatism requires making the cornea more spherical. The correction of visual errors by reshaping the cornea is generally referred to as orthokeratology. Contact lenses for orthokeratology have been described in, for example, El Hage, U.S. Pat. No. 5,695,509 and Wesley and Kim, International Patent Application WO 98/52090.

Proper fitting of orthokeratological contact lenses is difficult, and patients often must try several sets of lenses to determine a suitable fit. Such iterative lens selection is both expensive and inconvenient. In addition, in some cases, poorly fitting lenses can lead to temporary vision problems such as ghosting or haze, alarming and discouraging patients. According, improved orthokeratological contact lens and designs methods therefore are needed.

SUMMARY OF THE INVENTION

Design systems and methods for designing orthokeratologic contact lenses are disclosed. The methods specify positions and shapes of contact lens surfaces with respect to an anterior surface of a cornea, prior to molding by the contact lenses. The location of the anterior surface prior to molding is referred to herein as the unmolded anterior surface.

According to an embodiment, methods of designing a contact lens comprise selecting a base surface to provide correction of a vision error. The base surface is then positioned with respect to the unmolded anterior surface to satisfy at least one of a volume, cross-sectional area, surface area, or arc length constraint. In further embodiments, methods including positioning the base surface with respect to the anterior surface so that volumes defined by an intersection of the base surface with the unmolded anterior surface are substantially equal. In still further embodiments, the volumes include volumes defined by a relief surface and the unmolded anterior surface.

According to other embodiments, methods of designing a contact lens for shaping an anterior surface of a cornea include positioning the base surface with respect to the anterior surface so that surface areas defined by an intersection of the base surface with the unmolded anterior surface are substantially equal.

Additional embodiments disclose contact lens design methods in which cross-sectional areas defined by an intersection of the base surface and the unmolded anterior surface are substantially equal. In alternative embodiments, methods of designing a contact lens for shaping an anterior surface of a cornea include positioning the base surface with respect to the anterior surface so that arc lengths on the base surface and the unmolded anterior surface are substantially equal.

Computer readable media that include computer executable instructions for performing the above methods are provided.

Systems for designing an orthokeratologic contact lens are provided that include a database for storing and retrieving patient data and a user interface for entering and adjusting patient data. In addition, a design component (a portion of a computer program) specifies a contact lens design based upon patient data to satisfy at least one of a volume, cross-sectional area, surface area, or arc length constraint.

User interfaces for programs for designing an orthokeratologic contact lens include patient data fields for entering and displaying patient data and a design constraint field for specifying a design constraint for designing the orthokeratologic contact lens. The design constraints include a volume, surface area, cross-sectional area, arc length, and elevation constraint.

Contact lenses are provided that include a base zone having a base surface selected to mold the anterior surface of the cornea and a control zone having a control surface selected to align the contact lens on the cornea. The contact lenses also include a relief zone that includes a relief surface that fixes the control surface and the base surface relative to the anterior surface. The control surface positions at least one or both of the relief surface and the base surface relative to the unmolded anterior surface to satisfy a constraint selected from the group consisting of an arc length constraint, a surface area constraint, a cross-sectional area constraint, and a volume constraint.

The invention is directed to novel and non-obvious aspects of this disclosure, both individually and in combination as set forth in the claims below.

BRIEF DESCRIPTION OF THE DRAWINGS

FIG. 1A is a plan view of a contact lens.

FIG. 1B is a sectional view of the contact lens of FIG. 1A.

FIG. 2 is a sectional view of the contact lens of FIGS. 1A–1B positioned with respect to a cornea.

FIG. 5A illustrates a construction for determining a radius of a relief zone.

FIG. 6 is a schematic diagram of a user interface for a computer program for designing the contact lens of FIGS. 1A–1B.

DETAILED DESCRIPTION

Figure 3:
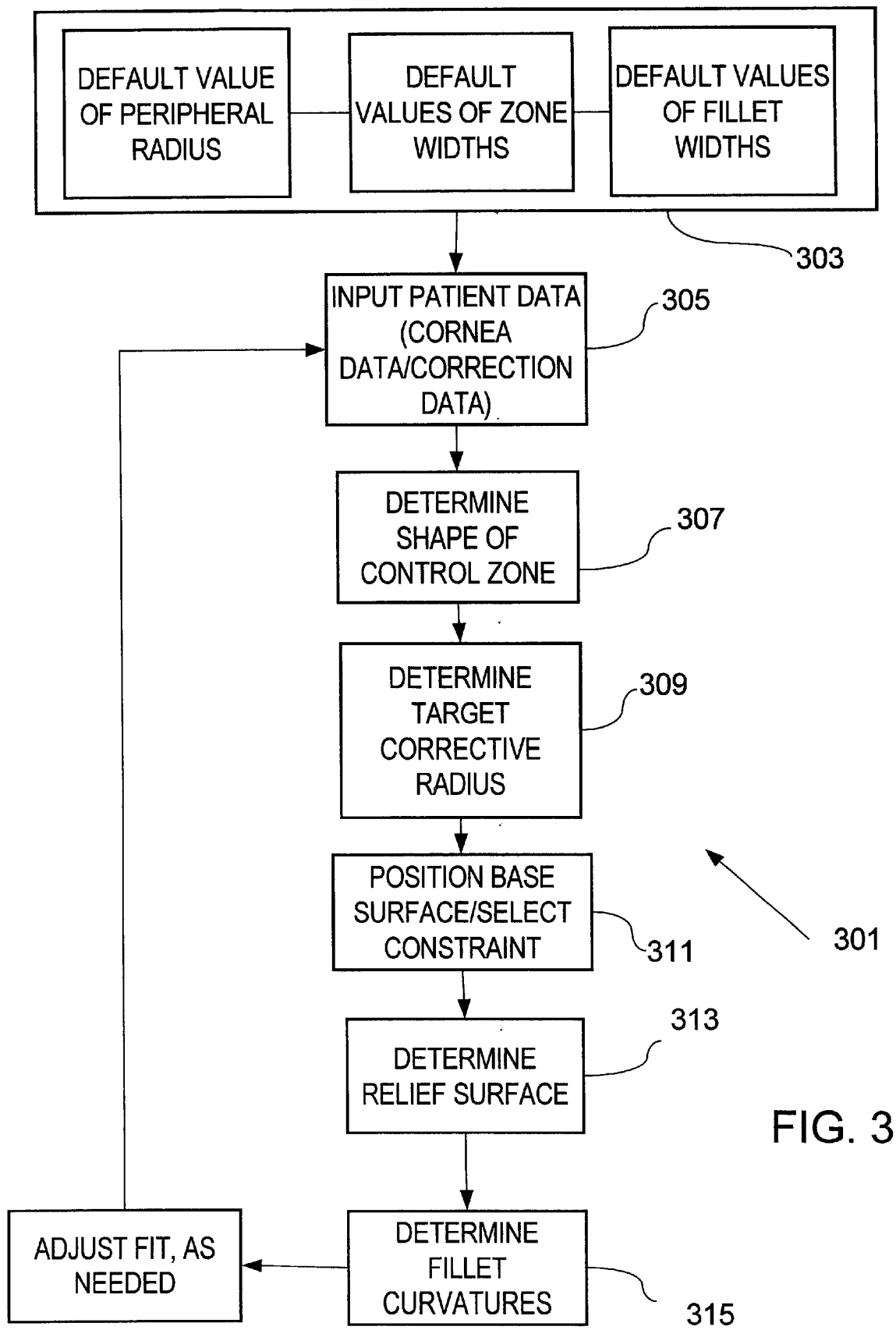
FIG. 3 is a block diagram of a procedure for fitting the contact lens of FIGS. 1A–1B to a cornea.

As used herein, "curve" refers to a surface shape, including surface shapes selected to correct vision errors such as myopia, hyperopia, or astigmatism. A surface can be spherical, cylindrical, elliptic, parabolic, hyperbolic, other aspheric shape, or a combination thereof. In addition, a curve can be symmetric about an axis of rotation or can be asymmetric. A spherical surface is conveniently described by a radius of curvature and a center of curvature. The radius of curvature is referred to as a "radius" and a reciprocal of the radius of curvature is referred to as a "curvature." A radius is conveniently measured in millimeters (mm) and curvature is generally measured in $m^{-1}$, also referred to as diopters (D).

FIGS. 1A–1B illustrate a contact lens 101 and FIG. 2 illustrates the contact lens 101 situated with respect to an anterior surface 203 of a cornea 201 on which the contact lens 101 is placed. The contact lens 101 is configured to reshape the anterior surface 203 to correct a vision error such as hyperopia, myopia, or astigmatism. In FIG. 2, the contact lens 101 is shown on the anterior surface 203 but does not show the molding or deformation of the anterior surface 203 by the contact lens 101. The surface shape of the anterior surface 203 is referred to herein as the unmolded anterior surface when necessary to distinguish the molded and unmolded corneal surface.

The contact lens 101 can be worn while the patient is awake but is intended for night wear so that the cornea 201 is molded during sleep. Because the cornea 201 is elastic, the shape of the anterior surface 203 can be molded by the contact lens 201 and the molded shaped can be maintained for some time after the contact lens 101 is removed from the cornea 201. As the contact lens 101 is worn, a central region 211 of the cornea 101 begins to approach the shape of the contact lens 101, and may, after extensive wear, assume the shape of the contact lens 101.

While conventional contact lenses for daytime wear are generally designed to move, the contact lens 101 is intended to remain stationary on the cornea 201 so that the forces applied by the contact lens 101 to the cornea 201 mold the anterior surface 203. During sleep, the cornea 201 swells by about 4%, and this swelling decreases the resistance of the cornea 201 by the contact lens 101. Although the eye moves slightly during sleep, these eye movements (referred to as rapid eye movements or micronystagamus) are small. As a result, the contact lens 101 tends to remain stationary with respect to the anterior surface 203 and can accurately mold the cornea 201.

The contact lens 101 (FIGS. 1A and 1B) includes an anterior surface 103 and a posterior surface 105. As worn by a patient, at least some portions of the posterior surface 105 contact and mold the anterior surface 203 of the cornea 201. The posterior surface 105 includes a base zone 107 having a base surface 109 that serves as a mold for the cornea 201. The shape of the base surface 109 is selected to correct a selected vision error. If, for example, the base surface 109 is a spherical surface, then the radius (or the curvature) of the base surface 109 is selected to provide vision correction. In addition, the curvature of the base surface 109 can be selected to compensate for the gradual relaxation of the anterior surface 203 to its uncorrected shape after removal of the contact lens 101. This compensation is typically accomplished by providing the base surface 109 with an additional curvature of between about –0.75 D and about 0.75 D, and depends on the type and magnitude of the vision error to be corrected. For example, in the correction of myopia, the shape of the base surface 109 is selected to flatten the cornea 201. To compensate for the relaxation of anterior surface 203, the curvature of the base surface 109 is provided with as much as about 0.75 D of additional flattening.

The contact lens 101 also includes a relief zone 111 that includes a relief surface 113. The relief surface 111 is selected to, for example, provide a volume between the cornea 201 and the posterior surface 105 to receive a corneal volume displaced by the base surface 109. As the central region 211 of the cornea 201 is flattened, the displaced volume can appear at the relief zone 111. The volume defined by the relief zone 111 can be selected to be substantially equal to the volume of the displaced cornea. Alternative criteria for selecting a shape and position of the relief surface 113 are described below. The relief surface 113 may or may not conform to the anterior surface 203 before or after the cornea 201 is molded by the contact lens 101.

A control zone 115 of the contact lens 101 includes a control surface 117 selected so that in the control zone 115, the posterior surface 105 of the contact lens 101 conforms to the anterior surface 203 of the cornea 201. The control surface 117 serves to align and center the contact lens 101 on the cornea 201. FIGS. 1A–1B and FIG. 2 show only a single control surface 117 in the control zone 115, but one or more additional control surfaces can be provided. The number of control surfaces 117 depends on how well a specific shape matches or is needed to match the anterior corneal surface 203. For example, if the anterior corneal surface 203 is nearly spherical, then the control surface 117 may be spherical as well. If the anterior surface 203 is not spherical, the control zone 115 may include several control surfaces having different shapes or curvatures so that each of the control surfaces matches the mathematical calculations for the shape of a corresponding portion of the anterior surface 203. The shapes of control zones can be determined by a variety of techniques such as, for example, corneal topographic mapping. Typically, a control zone 115 having a single, spherical control surface 117 is satisfactory.

The contact lens 101 also includes a peripheral zone 119 having a peripheral surface 121. The peripheral surface 121 is selected to provide edge lift to facilitate removal of the contact lens 101 from the cornea 201. In addition, the contact lens 101 includes fillet regions 123, 125, 127 at boundaries between the base zone 107 and the relief zone 111, the relief zone 111 and the control zone 115, and the control zone 115 and the peripheral zone 119, respectively. The fillet regions 123, 125, 127 are shaped to provide smooth transitions between the shapes of the adjacent zones which can control comfort and performance. Although not shown in FIGS. 1A–1B or FIG. 2, a tear layer is typically situated between the anterior surface 203 and the contact lens 101 and typically is about 0.025 mm thick.

As shown in FIG. 2, the contact lens 101 is positioned to mold the anterior surface 203 of the cornea 201. The base zone 107 of lens 101 is centered on a visual axis 205 that passes through an apex 207 of the cornea 201. The control surface 117 contacts the cornea 203 in an alignment area 209 and the base surface 109 compresses the central area 211 of the cornea 203, causing the central area 211 to deform to match the shape of the base surface 109. FIG. 2 shows a flattening of the central area 211 by the contact lens 101 as is typical in the correction of myopia, in which the differences in shading delineate the flattened area of the cornea.

In general, the anterior surface 203 of the cornea 201 approaches the shape of the base surface 109 as the contact lens 101 is worn. The volume of cornea compressed by lens 101 is displaced into relief zone 111.

FIG. 3 is a block diagram of a method 301 for fitting the contact lens 101 to a particular cornea for correction of a specific visual error. For convenience, the method 301 is illustrated using spherical surfaces for the base surface 109, the relief surface 113, the control surface 117, and the peripheral surface 121. However, aspheric or asymmetric surfaces can be used.

A default values block 303 stores selected default values for many parameters of the contact lens 101. Table 1 lists default values for widths of $W_{107}$, $W_{111}$, $W_{115}$, $W_{119}$ of zones 107, 111, 115, 119, respectively, wherein the widths are measured in a direction perpendicular to the axis 205. A default diameter of the contact lens 101 is a sum of a width of the base zone 107 plus twice a sum of the widths of the zones 111, 115, 119.

TABLE 1

Default values of zone widths.

| | |
|---|---|
| base zone 107 | 6.2 mm |
| relief zone 111 | 0.6 mm |
| control zone 115 | 1.0 mm |
| peripheral zone 119 | 0.4 mm |
| default diameter | 10.2 mm |

The width of the base zone 107 is the diameter of the base zone 107. During fitting, any of the zone widths can be varied from the default values.

Table 2 lists default values for widths of the fillet regions 123, 125, 127.

TABLE 2

Default values of fillet region widths.

| | |
|---|---|
| fillet region 123 | 0.10 mm |
| fillet region 125 | 0.05 mm |
| fillet region 127 | 0.08 mm |

The widths of any of the fillet regions can be varied from the default values. The fillet regions 123, 125, 127 are provided as regions that transition the shapes of corresponding zones and accordingly the curvatures of the filler regions 123, 125, 127 are not determined until after the shapes of the adjoining zones are selected. These fillet regions then may be varied to fine tune performance of the lens.

A default value of 12 mm is selected for a radius of the peripheral surface 121. This default radius is generally satisfactory, but the radius of the peripheral surface 121 can alternatively be selected as the radius of curvature of the control surface 119 plus a constant value between 1.0 mm and 5.0 mm.

In a data input block 305, patient data are received, including data specifying a shape of the anterior surface 203 and the type and amount of vision correction required. Radii for the base zone 107, the relief zone 111, the control zone 115, and the peripheral zone 119 and fillet curves can be specified based upon this data.

Figure 4:
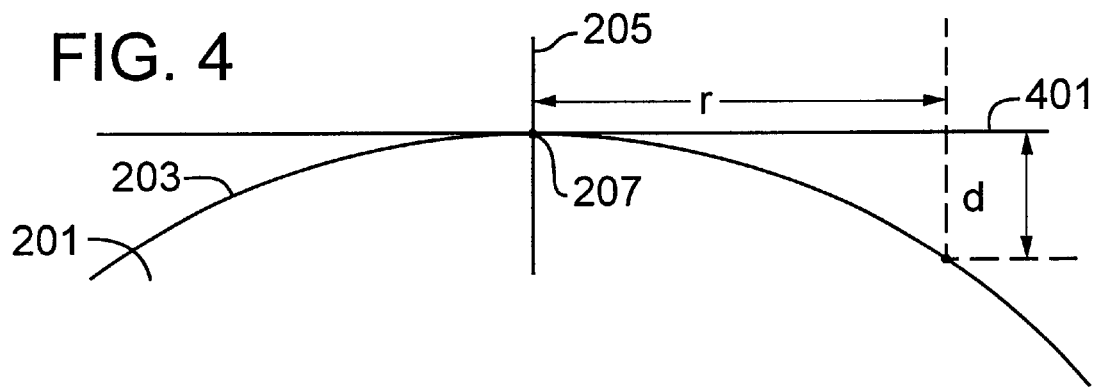
FIG. 4 illustrates a measurement of a surface sag provided by corneal topographic data.

The shape of the anterior surface 203 can be specified as corneal topographic data. FIG. 4 illustrates corneal topographic data that includes distances d between the anterior surface 203 and a plane 401 that is perpendicular to visual axis 205 and tangent to the anterior surface 203 at the apex 207, measured parallel to the axis 205 and as a function of a radial distance r from the axis 205. The distances d are saggital distances referred to as "sags." If the anterior surface 203 is not rotationally symmetric about the axis 205, the sags are also a function of an angle of rotation about the axis 205.

The shape of the anterior surface 203 is preferably specified from the axis 205 to an outer edge 131 of the control zone 115. Any of various corneal topography methods can be used to obtain this data. Alternatively, a standard keratometer measure ("k-value") can be used. The k-value characterizes the cornea 201 as a spherical surface and is generally obtained by measuring a small, central area of the cornea of radius of between about 2.5–4 mm. The k-value may not accurately characterize the shape of the cornea 201 beyond the measured area, particularly in areas such as the control area 209. In addition, because the k-value characterizes the anterior surface 203 as a spherical surface, the k-value does not provide a measure or estimate of any deviation of the shape of the anterior surface 203 from a spherical shape or other shape that is rotationally symmetric about the axis 205. Despite these limitations, the k-value is easily measured and keratometers for k-value measurement are widely available, making such measurements especially convenient, and the method of FIG. 3 can use k-values to fit the contact lens 101.

After the shape of the anterior surface 203 is specified by topographic data or other measurement, the control surface 117 is fit to the control area 209 in step 307. The shape of the control surface 117 is selected to match the shape and overflow of corneal volume being displaced from the base zone to the relief zone of the anterior surface 203 in the control area 209, i.e., a radius of the control surface 117 is selected as a radius of a sphere that closely matches the lowest curve of the central flat keratometer area 209. Using topographic data, this radius can be calculated by a least squares fit procedure that fits a sphere to the control area 209. The radius of the control surface 117 is initially set to this radius but can be adjusted to be either steeper or shallower within about 0.25 D to reduce or increase movement of the contact lens 101 during wear. In addition, the control surface 117 can have an aspheric or asymmetric shape selected to match the anterior surface 203 in the control area 209, if a better fit of the control surface 117 to the control area 209 is needed.

A radius of the base surface 109 ("base radius") is selected to provide the intended vision correction. Because the anterior surface 203 of the cornea 201 approaches the base surface 109, but does not always exactly mold to the base surface 109, the base radius can be selected to provide a slight overcorrection. For example, if corneal flattening is intended (such as for the correction of myopia), then the base radius is selected to slightly "overflatten" the anterior surface 203. Such a base radius is selected by subtracting from a prescribed visual correction an additional fitting increment of between 0.25 D and 1.5 D, and typically about 0.75 D. If the anterior surface 203 conforms rapidly to the base surface 109, a small fitting increment can be used. Such fitting increments can be selected based on an estimated lens wear period or to compensate for increased rates of corneal molding provided with methods such as the enzymatic method disclosed in Harris, U.S. Pat. No. 5,788,957.

After determining the base radius, the location of the base surface 109 with respect to the anterior surface 203 of the cornea is determined. FIG. 5A shows the base surface 109 positioned with respect to the anterior surface 203 so that cross-sectional areas 501, 503 are defined between the base surface 109 and the anterior surface 203. The center of curvature of the base surface 109 is positioned on the axis 205 so that the areas 501, 503 are equal. The center of curvature of the base surface 109 is then displaced an adjustable amount, typically about 0.025 mm) toward the corneal apex 207. The base surface 109 is then completely specified because the base radius and the center of curvature are specified.

The relief surface 113 is then selected to position the center of curvature of the base surface 109 with respect to the apex 207. By fixing the base surface 109 relative to the control surface 117, the location of the center of curvature of the base surface can be set as determined above. FIG. 5A shows how the relief surface 113 is selected to connect the base surface 109 and the control surface 117. The specification of the relief surface 113 is illustrated with a geometric construction but an algebraic construction can also be used. Such an algebraic construction can correspond directly to the geometric construction.

Endpoints 511, 513 of the relief surface 113 are determined as endpoints of the base surface 109 and inner endpoints of the control surface 117. The endpoints 511, 513 are connected to form a relief segment 515 and a perpendicular bisector 517 of the relief segment 515 is drawn. An intersection 519 of the perpendicular bisector 511 and the axis 205 is located. The fitting curve radius is a distance from the intersection 519 to either of the endpoints 511, 513 and the center of curvature of the relief curve is the intersection 519.

With the shapes of the base surface 109, the relief surface 113, and the control surface 117 specified, radii of the fillet regions 123, 125, 127 are determined as follows. The radius of the fillet region 123 is specified as a radius of a circle tangent to the base surface 109 and the relief surface 113 at points one-half the fillet region width (i.e., 0.05 mm, using the default value) from a point at which the base surface 109 and the relief surface 113 intersect, in the absence of the fillet region 123. The radii for the fillet regions 125, 127 are determined in the same manner. After specifying the radii of the fillet regions 123, 125, 127, the posterior surface 105 of the contact lens 101 is completely specified.

In the method 301 of FIG. 3, the center of curvature of the base surface 109 is displaced an adjustable amount from a location at which cross-sectional areas 511, 513 are equal. The base surface 109 can also be positioned to satisfy alternative constraints.

A volume constraint locates the center of curvature of the base surface 109 so that volumes corresponding to the areas 511, 513 are equal. The corresponding volumes are the volumes defined by rotating the areas 501, 503 about the axis 205.

FIG. 5A also illustrates a surface area constraint. A portion of the anterior surface 203 extending from the apex 207 to the point 513 has a surface area S. The base surface 109 is positioned with respect to the anterior surface 203 so that surface areas $S_1$, $S_2$ of the base surface 109 on opposite sides of the anterior surface 203 are equal, i.e., $S=S_1+S_2$. The surface areas can be obtained by summing or integrating incremental surface areas of the appropriate surfaces.

FIG. 5A also illustrates an arc length constraint. An arc 521 extending along the anterior surface 203 from the apex 207 to the endpoint 511 has a length L. The arc 521 is determined prior to molding of the anterior surface 203 by the contact lens 101 (i.e., with reference to the unmolded anterior surface). Arcs 525, 527 extend from the endpoint 511 to an intersection 523 of the anterior surface 203 and the base surface 109, and from the intersection 523 to the apex 207, respectively. Respective lengths L, $L_1$, $L_2$ at the arcs 521, 525, 527 are obtained by, for example, summing or integrating incremental lengths along the arcs 501, 505, 511, respectively. The center of curvature of the base surface 109 is selected so that the arc lengths L, $L_1$, and $L_2$ satisfy the condition $L=L_1+L_2$.

Figure 5B:
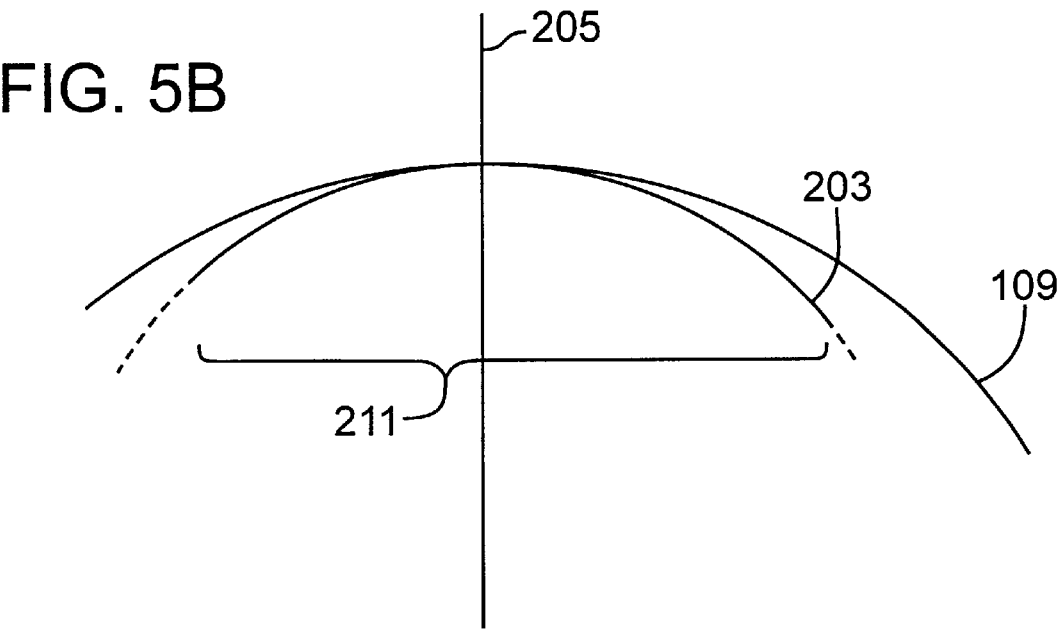
FIG. 5B illustrates positioning of a base surface with respect to an anterior surface according to an elevation constraint.

Another alternative constraint, referred to as an elevation constraint, positions the center of curvature of the base surface 109 to gradually mold the anterior surface 203 Referring to FIG. 5B, the base surface 109 is positioned (for myopia correction) to flatten the central region 211 of the anterior surface 203.

The cross-sectional area, volume, surface area, and arc length constraints discussed above locate the center of curvature of the base surface 109. The relief surface is then used to position the center of curvature appropriately relative to the control surface 117. In additional constraints, the cross-sectional areas, volumes, surface areas, and arc lengths used can include the cross-sectional area, volume, surface area, and arc length, respectively, contributed by the relief surface 113.

FIG. 6 is a schematic of a user interface of a computer program used to perform the fitting method described above, including selecting from the various fitting constraints. The user interface shown in FIG. 6 uses a visual programming language (VISUAL BASIC) in conjunction with a spreadsheet program (MICROSOFT EXCEL) that execute on a P.C. or MAC computer. Other spreadsheet programs and other computers can be used, and a dedicated design program can be used instead of using a spreadsheet. Computer readable instructions for the user interface, the spreadsheet program, and the visual programming language are stored on a hard disk, a floppy disk, a CD ROM, or other computer readable medium.

As illustrated in FIG. 6, the spreadsheet program provides a simple, convenient database for patient information or data, contact lens default values, materials, and other information while contact lens fitting computations are performed in a design component implemented in VISUAL BASIC.

The user interface provides data fields 600, 602, 604 for patient data including patient name, identification number (ID), and prescription, respectively. A design model menu bar 606 is provided to permit selection of a design constraint from a drop-down menu 610. The design constraints available in FIG. 6 include all the constraints discussed above. Radii of curvature (RAD) and zone widths (WID) are displayed by or input via the user interface as well as any clinician adjustments (adj).

The method 301 of FIG. 3 was discussed using spherical surfaces for the base surface 109, the relief surface 113, and the control surface 117. However, the method 301 can fit contact lenses having asymmetric surfaces and aspheric surfaces. Asymmetric surfaces can be specified by radii of curvature along different directions perpendicular to the axis 205, and are particularly suited for correction of astigmatism.

Tables 3–4 list design parameters for example lenses for three patients and include lens parameters for left eyes (OS) and right eyes (OD). Diameters and widths are expressed in millimeters (mm) and curvatures are expressed in diopters (D). The lenses of Tables 3–4 are made of EQUALENS II material (optifocon A) having a refractive index n=1.423. As shown in Table 4, the lenses for Patient 3 include both a first control zone and a second control zone having different widths and curvatures.

TABLE 3

Examples Lenses (Patients 1–2)

| | Patient 1 | | Patient 2 | |
|---|---|---|---|---|
| Parameter | OD | OS | OD | OS |
| base zone curvature | 8.52 | 8.52 | 8.63 | 8.63 |
| lens power | +.75 | +.75 | +.75 | +.75 |
| lens diameter | 10.2 | 10.2 | 10.2 | 10.2 |
| base zone diameter | 6.2 | 6.2 | 6.2 | 6.2 |
| relief zone width | 0.6 | 0.6 | 0.6 | 0.6 |
| relief zone curvature | 6.89 | 6.82 | 7.12 | 7.12 |
| first control zone width | 1.0 | 1.0 | 1.0 | 1.0 |
| first control zone curvature | 7.78 | 7.73 | 8.01 | 8.01 |
| peripheral zone width | 0.4 | 0.4 | 0.4 | 0.4 |
| peripheral zone curvature | 11.0 | 11.0 | 12.0 | 12.0 |
| center thickness | .22 | .22 | .22 | .22 |

TABLE 4

Example Lenses (Patient 3)

| Parameter | OD | OS |
|---|---|---|
| base zone curvature | 8.08 | 8.08 |
| lens power | +1.25 | +1.25 |
| lens diameter | 10.4 | 10.4 |
| base zone diameter | 6.2 | 6.2 |
| relief zone width | 0.4 | 0.4 |
| relief zone curvature | 6.46 | 6.40 |
| first control zone width | 0.7 | 0.7 |
| first control zone curvature | 7.58 | 7.58 |
| second control zone width | 0.4 | 0.4 |
| second control zone curvature | 7.63 | 7.63 |
| peripheral zone width | 0.5 | 0.5 |
| peripheral zone curvature | 12.0 | 12.0 |
| center thickness | .22 | .22 |

Having illustrated and demonstrated the principles of the invention in several examples, it should be apparent to those skilled in the art that these examples can be modified in arrangement and detail without departing from such principles. We claim as the invention all that comes within the scope of the appended claims.

What is claimed is:

1. A method of designing a contact lens for shaping an anterior surface of a cornea, comprising:
   selecting a base surface having a base surface perimeter; and
   positioning the base surface with respect to an unshaped anterior surface of the cornea to define a first arc that includes an arc portion extending from an apex of the unshaped anterior surface of the cornea to a perimeter of a portion of the unshaped anterior surface corresponding to the base surface perimeter, and a second arc that includes a base surface portion extending from a base surface apex to the base surface perimeter, wherein an arc length of the first arc is substantially equal to an arc length of the second arc.

2. The method of claim 1, further comprising:
   providing a relief surface connected to the base surface at the base surface perimeter; and
   positioning the base surface with respect to the anterior surface with the relief surface.

3. The method of claim 2, wherein the portion of the unshaped anterior surface corresponds to the base surface and the relief surface, and the second arc includes a relief surface portion that extends from the base surface perimeter to a relief surface perimeter.

4. A computer readable medium that includes computer executable instructions for performing the method recited in claim 3.

5. A computer readable medium that includes computer executable instructions for performing the method recited in claim 2.

6. The method of claim 2, further comprising:
   joining the base surface and the relief surface with a fillet region; and
   selecting a radius of curvature for the fillet region based on a radius of a circle tangent to the base surface and the relief surface and centered at an intersection of extensions of the base surface and the relief surface.

7. The method of claim 3, further comprising:
   providing a first fillet region configured to join the base surface and the relief surface;
   selecting a radius of curvature for the first fillet region based on a radius of a circle tangent to the base surface and the relief surface and centered at an intersection of extensions of the base surface and the relief surface.

8. The method of claim 7, further comprising providing a control surface connected to the relief surface with a second fillet region, wherein the control surface is configured to position the contact lens on a portion of the unshaped anterior surface.

9. The method of claim 8, further comprising selecting a radius of curvature for the second fillet region based on a radius of a circle tangent to the control surface and the relief surface and centered at an intersection of extensions of the control surface and the relief surface.

10. The method of claim 2, further comprising joining the base surface and the relief surface with a first fillet region.

11. The method of claim 10, further comprising selecting a radius of curvature for the first fillet region based on a radius of a circle tangent to the base surface and the relief surface and centered at an intersection of extensions of the base surface and the relief surface.

12. The method of claim 10, further comprising providing a control surface connected to the relief surface with a second fillet region, wherein the control surface is configured to position the contact lens on a surface of an eye.

13. The method of claim 12, further comprising selecting a radius of curvature for the second fillet region based on a radius of a circle tangent to the control surface and the relief surface and centered at an intersection of extensions of the control surface and the relief surface.

14. A method of designing a contact lens for shaping an anterior surface of a cornea, comprising:
   selecting a base surface having a base surface perimeter;
   selecting a relief surface having a relief surface perimeter; and
   positioning the base surface with respect to an unshaped anterior surface of the cornea to define a first cross-sectional area in a cross-sectional plane containing an optical axis passing through an apex.of the anterior surface, the first cross-sectional area extending from the optical axis to an intersection of the base surface and the unshaped anterior surface, and a second cross-sectional area in the cross-sectional plane that extends from the intersection of the base surface and the unshaped anterior surface to the relief surface perimeter, wherein the first cross-sectional area is substantially equal to the second cross-sectional area.

15. A computer re medium that includes computer-executable instructions for performing the method of claim 14.

16. The method of claim 14, further comprising providing a control surface connected to the relief surface with a second fillet region, wherein the control surface is configured to conform to a portion of the shaped anterior surface.

17. The method of claim 16, further comprising selecting a radius of curvature for the second fillet region based on a radius of a circle tangent to the control surface and the relief surface and centered at an intersection of extensions of the control surface and the relief surface.

18. The method of claim 14, further comprising joining the base surface and the relief surface with a first fillet region.

19. The method of claim 18, further comprising selecting a radius of curvature for the first fillet region based on a radius of a circle tangent to the base surface and the relief surface and centered at an intersection of extensions of the base surface and the relief surface.

20. The method of claim 19, further comprising providing a control surface connected to the relief surface with a second fillet region, wherein the control surface is configured to position the contact lens on a surface of an eye.

21. The method of claim 20, further comprising selecting a radius of curvature for the second fillet region based on a radius of a circle tangent to the control surface and the relief surface and centered at an intersection of extensions of the control surface and the relief surface.

* * * * *

UNITED STATES PATENT AND TRADEMARK OFFICE
CERTIFICATE OF CORRECTION

PATENT NO. : 6,582,077 B1
DATED : June 24, 2003
INVENTOR(S) : Roger L. Tabb and Daniel G. Ballegeer It is certified that error appears in the above-identified patent and that said Letters Patent is hereby corrected as shown below:

Column 10,
Line 65, delete "A computer re medium" and insert -- A computer readable medium --.

Signed and Sealed this

Eighteenth Day of October, 2005

JON W. DUDAS
*Director of the United States Patent and Trademark Office*